US006254955B1

(12) United States Patent
Kuo et al.

(10) Patent No.: US 6,254,955 B1
(45) Date of Patent: Jul. 3, 2001

(54) SELF-STICK WRITING NOTE

(75) Inventors: Tsung-Tien Kuo; Jen-Rong Liu, both of Kaohsiung Hsien; Ho-Tsai Lin; Ho-Chi Chen, both of Kaohsiung, all of (TW)

(73) Assignee: Taiwan Hopax Chems. Mfg. Co., Ltd., Feng-Shan (TW)

( * ) Notice: Subject to any disclaimer, the term of this patent is extended or adjusted under 35 U.S.C. 154(b) by 0 days.

(21) Appl. No.: 09/356,712

(22) Filed: Jul. 20, 1999

(51) Int. Cl.[7] .................................. B32B 7/12; C09J 7/02

(52) U.S. Cl. ........................ 428/42.2; 428/42.3; 428/42.1; 462/72

(58) Field of Search .................................. 428/42.2, 42.3, 428/42.1, 40.1; 462/72; 40/638

(56) References Cited

U.S. PATENT DOCUMENTS

| | | | | |
|---|---|---|---|---|
| 2,096,389 | * | 10/1937 | Bode | 428/42.2 |
| 5,641,550 | * | 6/1997 | Berman et al. | 428/42.3 X |
| 5,948,494 | * | 9/1999 | Levin | 428/42.3 X |
| 6,071,584 | * | 6/2000 | Ritter | 428/42.2 X |

* cited by examiner

*Primary Examiner*—Daniel Zirker
(74) *Attorney, Agent, or Firm*—Hamilton, Brook, Smith & Reynolds, P.C.

(57) ABSTRACT

A stack of self-stick writing notes includes a plurality of self-stick writing sheets, each of which has a layer of removable pressure sensitive adhesive. The writing sheets are disposed one above the other to form a stack. A plastic sheet is attached to a bottom of the stack. Each of a plurality of labeling tabs includes a layer of removable pressure sensitive adhesive attached to the plastic sheet.

6 Claims, 3 Drawing Sheets

SELF-STICK WRITING NOTE

BACKGROUND OF THE INVENTION

1. Field of the Invention

This invention relates to a stack of self-stick writing notes, more particularly to a stack of self-stick writing notes having a plastic sheet with labeling tabs attached thereto.

2. Description of the Related Art

Self-stick writing notes have become popular in recent years since they can be attached on a surface of a table, a wall, a book or a document as desired for reminding purposes. FIG. 1 illustrates a stack 1 of conventional self-stick writing notes 10. The stack 1 includes a bottom paper 11 disposed at the bottom thereof for protection of the bottom one of the writing notes 10 from dirt or damage. However, the stack 1 of the conventional self-stick writing notes 10 suffers from the drawback in that the bottom paper 11 is made of a thick paper, which is not water-proof and which tends to be damaged due to its insufficient mechanical strength, thereby losing its ability to protect the writing notes 10. Furthermore, when the writing notes are applied on a large amount of documents, it becomes more difficult to identify and to trace these writing notes.

SUMMARY OF THE INVENTION

Therefore, it is an object of the present invention to provide a stack of self-stick writing notes that has high mechanical strength and that has a water-proofing ability. In addition, the stack of self-stick writing notes of this invention permits labeling, such as indexing, classifying, giving priority and the like, of documents to be worked on.

According to the present invention, a stack of self-stick writing notes comprises: a plurality of self-stick writing sheets, each of which includes a layer of removable pressure sensitive adhesive, the writing sheets being disposed one above the other to form a stack; a plastic sheet attached to a bottom of the stack, and a plurality of labeling tabs, each of which includes a layer of removable pressure sensitive adhesive attached to the plastic sheet.

BRIEF DESCRIPTION OF THE DRAWINGS

In drawings which illustrate the preferred embodiments of the invention.

DETAILED DESCRIPTION OF THE PREFERRED EMBODIMENTS

Figure 1:
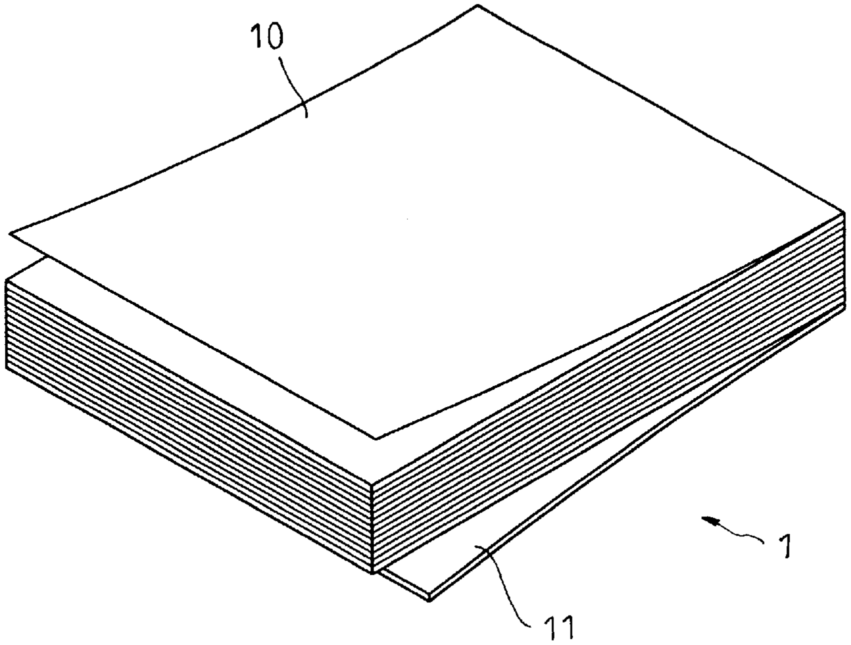
FIG.1 PRIOR ART
FIG. 1 illustrates a perspective view of a stack of a conventional self-stick writing notes.
Figure 2:
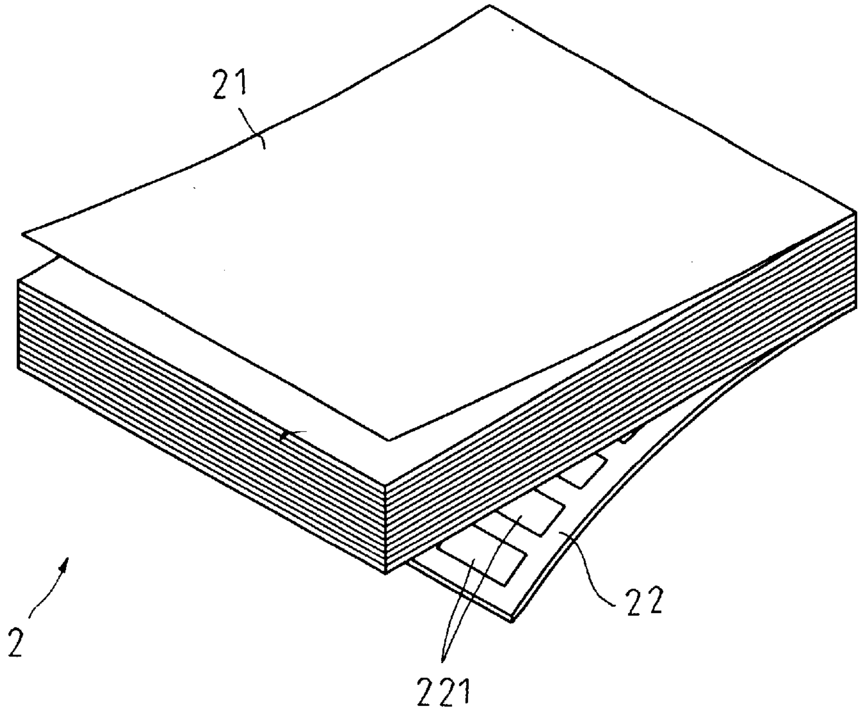
FIG. 2 illustrates a stack of self-stick writing notes of the present invention.
Figure 3:
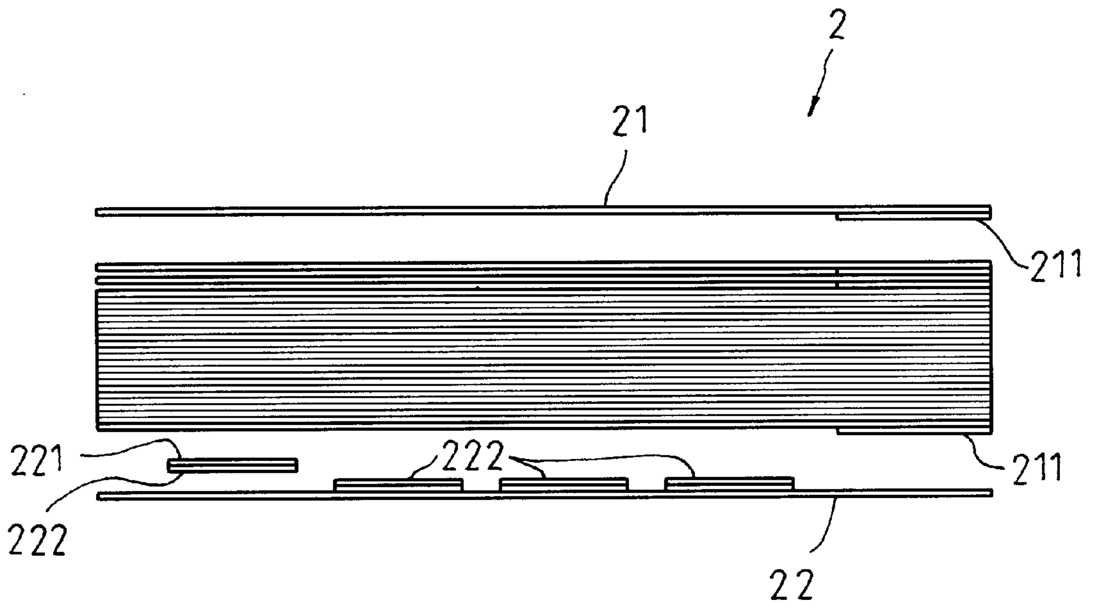
FIG. 3 is a side view of the stack of self-stick writing notes of FIG. 2.

FIGS. 2 and 3 illustrate a stack 2 of self-stick writing notes embodying this invention. The stack 2 includes a plurality of self-stick writing sheets 21, each of which is provided with a layer 211 of removable pressure sensitive adhesive. The writing sheets 21 are disposed one above the other to form the stack 2. The removable pressure sensitive adhesive described above may be any one of pressure sensitive adhesives known in the art. A typical example of the removable pressure sensitive adhesive 211 is an acrylate-type adhesive.

A plastic sheet 22 is provided on a bottom of the stack 2 for protection of the writing notes 21 from dirt or damage. The plastic sheet 22 is made from a material selected from the group consisting of polypropylene, polyethylene, polyvinyl chloride, polyethylene terephthalate, and mylar.

The stack 2 of this invention further includes a plurality of labeling tabs 221, each of which is provided with a layer 222 of removable pressure sensitive adhesive attached to a top side of the plastic sheet 22 for the purpose of indexing, classifying, giving priority and the like, of documents to be worked on. The labeling tabs 221 can also be attached on the opposite bottom side, or on both the top and bottom sides of the plastic sheet 22. The labeling tabs 221 can be labels or small tabs of self-stick writing notes.

Figure 4:
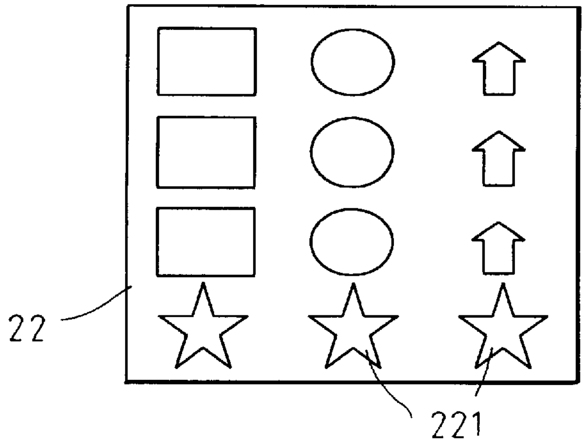
FIG. 4 illustrates different shapes of labels attached to a plastic bottom sheet of the stack of self-stick writing notes of FIG. 2.
Figure 5:
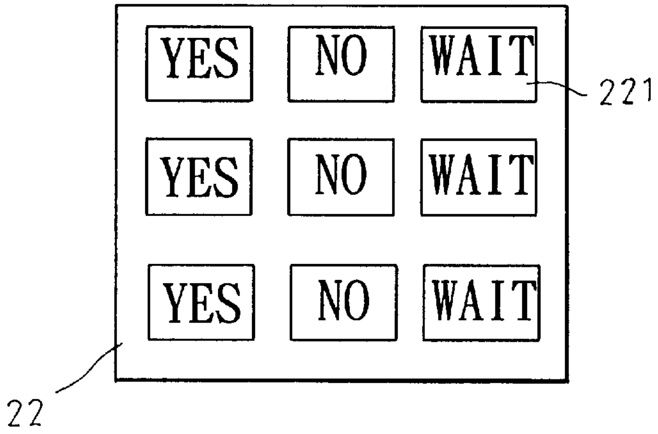
FIGS. 5 and 6 illustrate different patterns printed on labels attached to a plastic bottom sheet of the stack of self-stick writing notes of FIG. 2.
Figure 6:
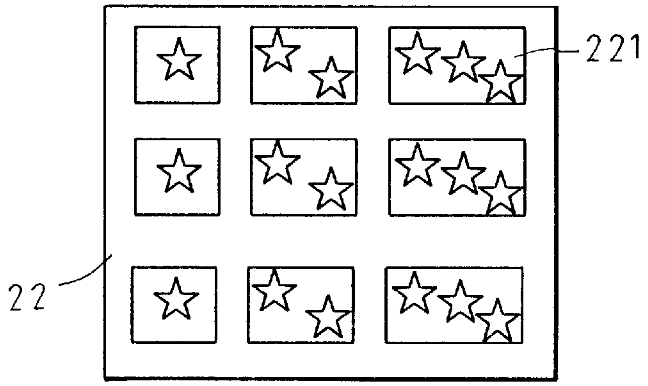

As illustrated in FIGS. 4 to 6, the labeling tabs 221 attached to the plastic sheet 22 can have different configurations, colors, and/or patterns printed thereon for different purposes, such as giving priority, showing status, classifying documents and so on.

With the invention thus explained, it is apparent that various modifications and variations can be made without departing from the spirit of the present invention. It is therefore intended that the invention be limited only as recited in the appended claims.

We claim:

1. A stack of self-stick writing notes, comprising:

a plurality of self-stick writing sheets, each of which includes a layer of removable pressure sensitive adhesive, said writing sheets being disposed one above the other to form a stack, said stack having a bottom;

a plastic sheet attached to said bottom of said stack; and a plurality of labeling tabs, each of which includes a layer of removable pressure sensitive adhesive attached to said plastic sheet.

2. The stack of self-stick writing notes of claim 1, wherein said labeling tabs are labels.

3. The stack of self-stick writing notes of claim 2, wherein said labels have different colors.

4. The stack of self-stick writing notes of claim 2, wherein said labels have different configurations.

5. The stack of self-stick writing notes of claim 2, wherein said labels have different patterns printed thereon.

6. The stack of self-stick writing notes of claim 2, wherein said labeling tabs are disposed on a top side of said plastic sheet.

* * * * *